United States Patent
Khayrallah et al.

[11] Patent Number: 6,047,171
[45] Date of Patent: Apr. 4, 2000

[54] METHOD AND APPARATUS FOR COMBATING ADJACENT CHANNEL INTERFERENCE USING MULTIPLE IF FILTERS

[75] Inventors: Ali S. Khayrallah, Apex; Jiann-Ching Guey, Durham, both of N.C.

[73] Assignee: Ericsson Inc., Research Triangle Park, N.C.

[21] Appl. No.: 09/004,481

[22] Filed: Jan. 8, 1998

[51] Int. Cl.[7] .................................................. H04B 1/06
[52] U.S. Cl. ........................ 455/266; 455/296; 455/340
[58] Field of Search ................................. 455/266, 340, 455/295, 296, 311

[56] References Cited

U.S. PATENT DOCUMENTS

| | | | |
|---|---|---|---|
| 4,907,293 | 3/1990 | Ueno | 455/295 |
| 5,241,697 | 8/1993 | Hansen | 455/266 |
| 5,303,413 | 4/1994 | Braegas | 455/266 |
| 5,339,455 | 8/1994 | Vogt et al. | 455/266 |
| 5,493,717 | 2/1996 | Schwarz | 455/295 |
| 5,564,093 | 10/1996 | Matsumoto | 455/266 |

FOREIGN PATENT DOCUMENTS

| | | |
|---|---|---|
| 0 578 007 A1 | 1/1994 | European Pat. Off. . |
| 0 629 053 A1 | 12/1994 | European Pat. Off. . |
| 0 722 226 A1 | 7/1996 | European Pat. Off. . |
| 42 44 630 A1 | 7/1993 | Germany . |
| PCT/US99/00342 | 5/1999 | WIPO . |

OTHER PUBLICATIONS

Website Abstract, Matsushita Elec Ind Co Ltd; (Matu;), Feb. 25, 1997, p. 1.
Website Abstract, General KK; (Genh;), Feb. 25, 1997, p. 1.
Website Abstract, Kenwood Corp; (TRIR;) Feb. 25, 1997, p. 1.

*Primary Examiner*—William G. Trost
*Assistant Examiner*—Quochien Ba Vuong
*Attorney, Agent, or Firm*—Jenkens & Gilchrist, P.C.

[57] ABSTRACT

A receiver includes at least two intermediate frequency (IF) filters, with the first IF filter and a second filter having a narrower bandwidth than the first bandwidth. The receiver also includes a switch operable to select between the IF filters. In use, the receiver measures the signal strength of adjacent channels to the signal strength of a desired channel and switches to the second IF filter with a narrower bandwidth when a ratio of the signal strength of the channel and the signal strength of adjacent channels is less than a predetermined threshold. The predetermined threshold is determined based on considerations of range of detection and adjacent channel interference. The bandwidth of the filters in the receiver is also designed to optimize performance in consideration of both range of detection and adjacent channel interference.

18 Claims, 4 Drawing Sheets

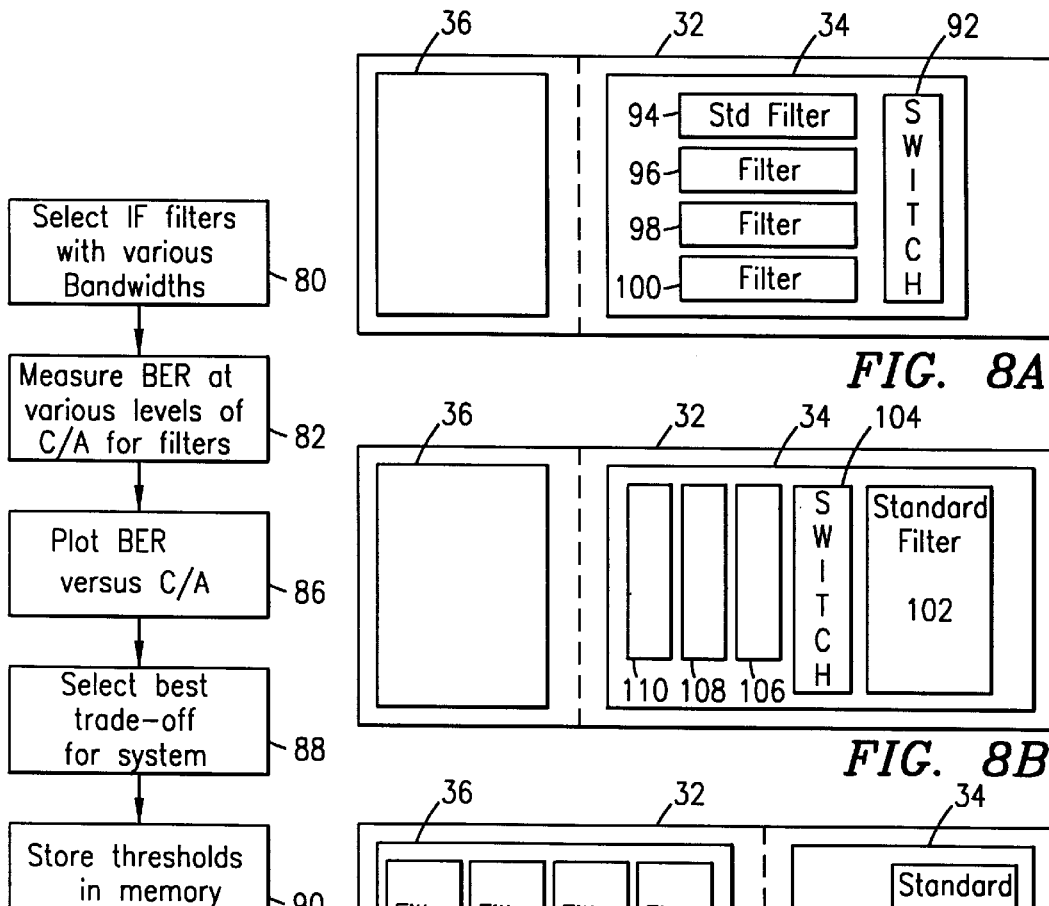
FIG. 8A
FIG. 8B
FIG. 6
FIG. 8C
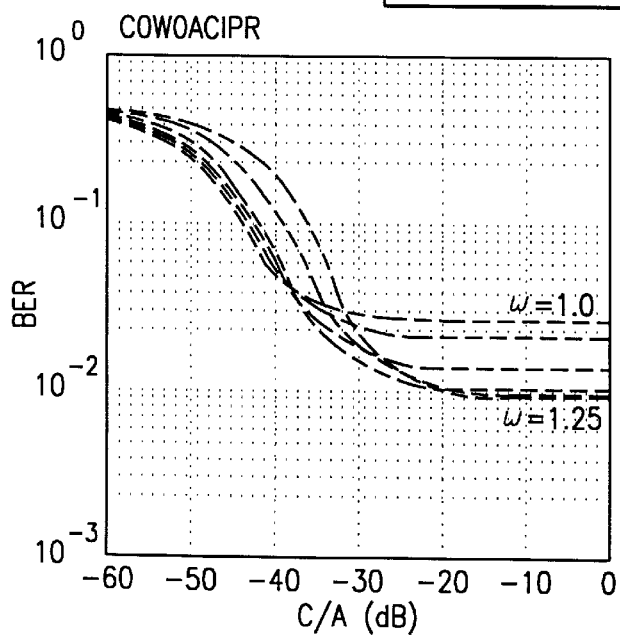
FIG. 7

METHOD AND APPARATUS FOR COMBATING ADJACENT CHANNEL INTERFERENCE USING MULTIPLE IF FILTERS

BACKGROUND OF THE INVENTION

TECHNICAL FIELD OF THE INVENTION

The present invention relates to receivers, and more particularly to the use of intermediary frequency filters in receivers.

BACKGROUND OF THE INVENTION

FIG. 1 illustrates a typical wireless communications systems 2. A plurality of mobile stations (MS) 10 are located in a geographical service area covered by cells C1 through C6. Radio base stations (RBS) 4 are positioned within the geographic area covered by the cells C1 through C6 and act as an interface between the mobile station 10 and the wireless communications system 2.

The radio base stations 4 are connected by a dedicated wireline to a mobile telephone switching office (MTSO) 6, also known as a mobile service switching center in certain wireless communications systems. The MTSO 6 is connected a public switched telephone network (PSTN) 8 and may be connected to other MTSO's (illustrated by dotted line). The MTSO 6 controls the operation of the radio base stations 4 within the wireless communications system 2, such as setting up calls and coordinating the activities of the radio base stations 4. In addition, the MTSO 6 acts as switch to direct calls to and from the proper radio base station 4. The other MTSO's similarly control other radio base stations.

The wireless communications system 2 of FIG. 1 has only a limited band of allowed frequency usage. To efficiently use this limited band, the geographical service area of the wireless communications system 2 is divided into a plurality of cells C1 through C6, with each cell assigned a set of channels in the allowed frequency band. Each set of channels is reused every k number of cells so that adjacent cells are assigned a set of disjoint channels to try to alleviate co-channel interference.

An important consideration when designing receivers for use in cellular telephony systems is range of a signal, especially when a particular cell is large. For example in DLMR systems, cells are often large and range is an important performance criterion. As a result, receivers in mobile stations are typically optimized for performance in consideration of such factors as range of detection.

However, adjacent channel interference (ACI) is often not taken into consideration when designing the receivers in mobile stations. ACI is present in cellular telephony systems especially when users in adjacent channels are uncoordinated, i.e., the users are transmitting and receiving to respective adjacent channels. This oversimplification of the environment in which mobile stations operate leads to a design of receivers which is not optimum, especially in the presence of adjacent channel interference.

A need has thus arisen in the industry for a receiver with optimum performance in consideration of the effects of both adjacent channel interference and range of detection.

SUMMARY OF THE INVENTION

The present invention is directed to a receiver for balancing considerations of adjacent channel interference and range of detection. The invention includes a controller that determines a first ratio of signal strength of a desired channel to signal strength of adjacent channels, and a receiver having a first filter with a first bandwidth and second filter with a second bandwidth that is narrower than the first bandwidth. The receiver further includes a switch that switches to the first filter in response to the first ratio being greater than a predetermined threshold and switches to the second filter in response to the first ratio being less than the predetermined threshold.

BRIEF DESCRIPTION OF THE DRAWINGS

For a more complete understanding of the present invention and for further objects and advantages thereof, reference may now be had to the following description taken in conjunction with the accompanying drawings, in which like numerals are used for similar parts:

FIG. 6 illustrates a flow chart of a method for determining thresholds and bandwidth of IF filters installed in the mobile station in the present invention;

FIG. 7 illustrates a graph for determining thresholds and bandwidths of IF filters in the present invention; and FIGS. 8a, 8b, and 8c illustrate embodiments of a down converter stage of a receiver in the present invention.

DETAILED DESCRIPTION OF THE INVENTION

The present invention will now be described more fully hereinafter with reference to the accompanying drawings, in which preferred embodiments of the invention are shown.

Figure 2:
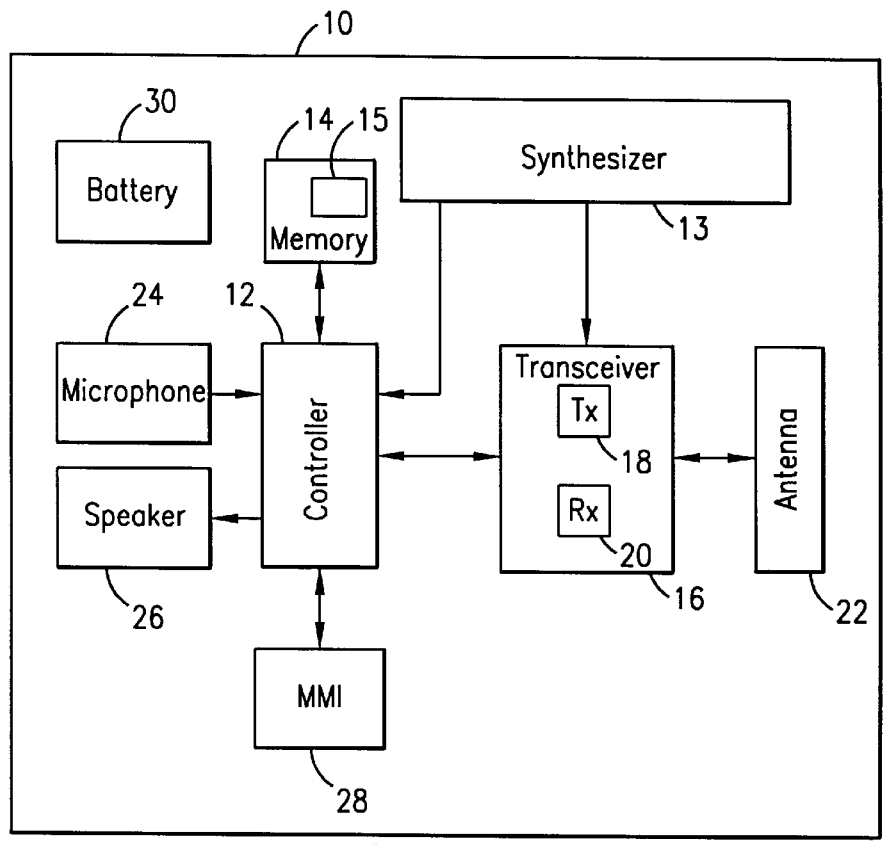
FIG. 2 illustrates a block diagram of a mobile station of the present invention in the cellular telephony network.

FIG. 2 illustrates a mobile station 10 in which the present invention may be implemented. The mobile station 10 includes a controller 12 which controls the overall functions and operation of the mobile station 10. The controller 12 typically includes a central processing unit (CPU) and I/O ports (not shown) and a memory 14. The memory 14 includes a look-up table 15, explained in more detail below. The memory 14 may alternatively be located within controller 12. The controller 12 processes voice or data signals to and from a transceiver 16. The transceiver 16 includes a transmitter 18 and receiver 20. The transmitter 18 converts a voice or data signal from the controller 12 to a radio wave while the receiver 20 detects and demodulates a received radio wave into a voice or data signal, as explained in more detail below. The transceiver 16 is connected to an antenna 22 for radio transmission and reception of radio waves.

The controller 12 is also connected to a microphone 24, speaker 26 and man-machine interface (MMI) 28. The microphone 24 includes a dynamic microphone, condenser microphone, or the like to transduce a user's voice into an electrical signal. An analog to digital converter (ADC) (not shown) converts the electrical signal into a digital voice signal. The speaker 26 outputs a received voice signal, and typically includes a digital-to-analog converter (DAC) (not shown) and amplifier (not shown). The man-machine interface 28 includes a display, such as an LED or LCD, and a keypad or other controls. A rechargeable battery 30 provides power to the mobile station 10.

A synthesizer 13 is connected to the controller 12 and transceiver 16. The synthesizer 26 generates signals at variable frequencies in response to an input frequency value from the controller 12. The generated signals are communicated to the transceiver 16 for transmission by the transmitter 18 at a channel about the frequency of the generated signal and for reception by the receiver 20 at a channel about the frequency of the generated signal.

In the present invention, the receiver 20 has the ability to switch between multiple intermediate frequency (IF) filters with varying bandwidth to optimize the range of detection of the receiver 20 and to minimize the effects of adjacent channel interference. In prior art systems, the bandwidth of the filter in a receiver in a mobile station is typically selected to optimize performance based on the range of detection in the absence of adjacent channel interference. However, this manner of design does not optimize performance of the receiver in the presence of adjacent channel interference. In the present invention, the bandwidth of the IF filter in the receiver is varied, such as by switching to another IF filter or adding another IF filter, depending on the adjacent channel interference. A narrower bandwidth in the IF filter results in a relatively small loss in range and a large gain in adjacent channel interference protection ratio (ACIPR). The threshold of adjacent channel interference at which to switch between IF filters, and thereby change filter bandwidth of the IF filters in the receiver 20 are predetermined to optimize the range of detection of the receiver 20 at the given level of adjacent channel interference, as explained in more detail below.

Figure 3:
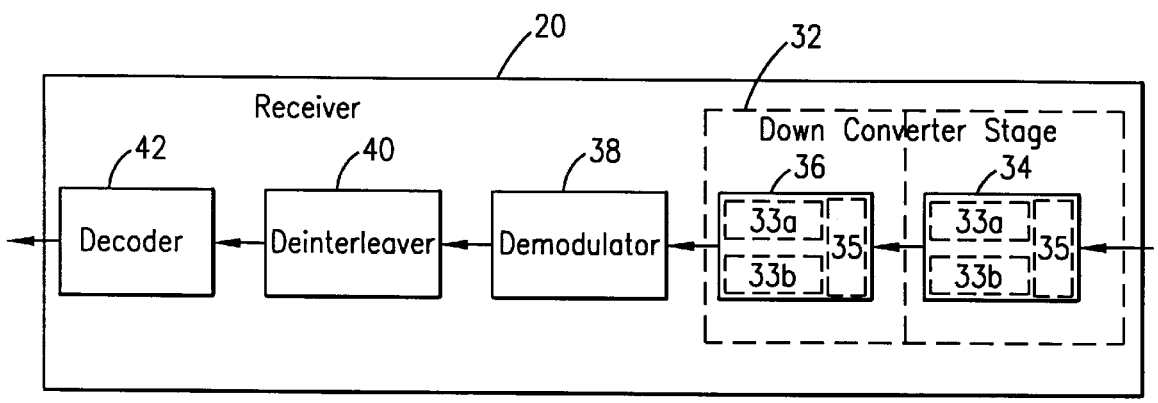
FIG. 3 illustrates a block diagram of a receiver of the present invention.

The receiver 20 in the mobile station 10 is shown in more detail in FIG. 3. The receiver 20 typically includes a low-noise amplifier (not shown), and a down converter stage 32, typically to an intermediate frequency. The down converter stage 32 includes two filter blocks, an analog filter block 34 and digital filter block 36. The analog filter block 34 and the digital filter block 36 may include at least two IF filters 33a and 33b. The down converter stage 32 may include further IF filters with varying bandwidths, as shown in more detail with respect to FIGS. 8a through c. The IF filters 33a and 33b are shown in dotted lines to indicate that the IF filters may be ceramic analog digital filters located in the analog filter block 34 or digital filters in the digital filter block 36 or a combination thereof. The IF filters 33a and 33b have different bandwidths, one being narrower than the other, that optimize the balance between maximizing the range of detection of the receiver 20 and minimizing the effects of adjacent channel interference. Each of the filter blocks 34 and 36 also includes a switch 35 operable to switch between the two IF filters 33a and 33b.

Figure 1:
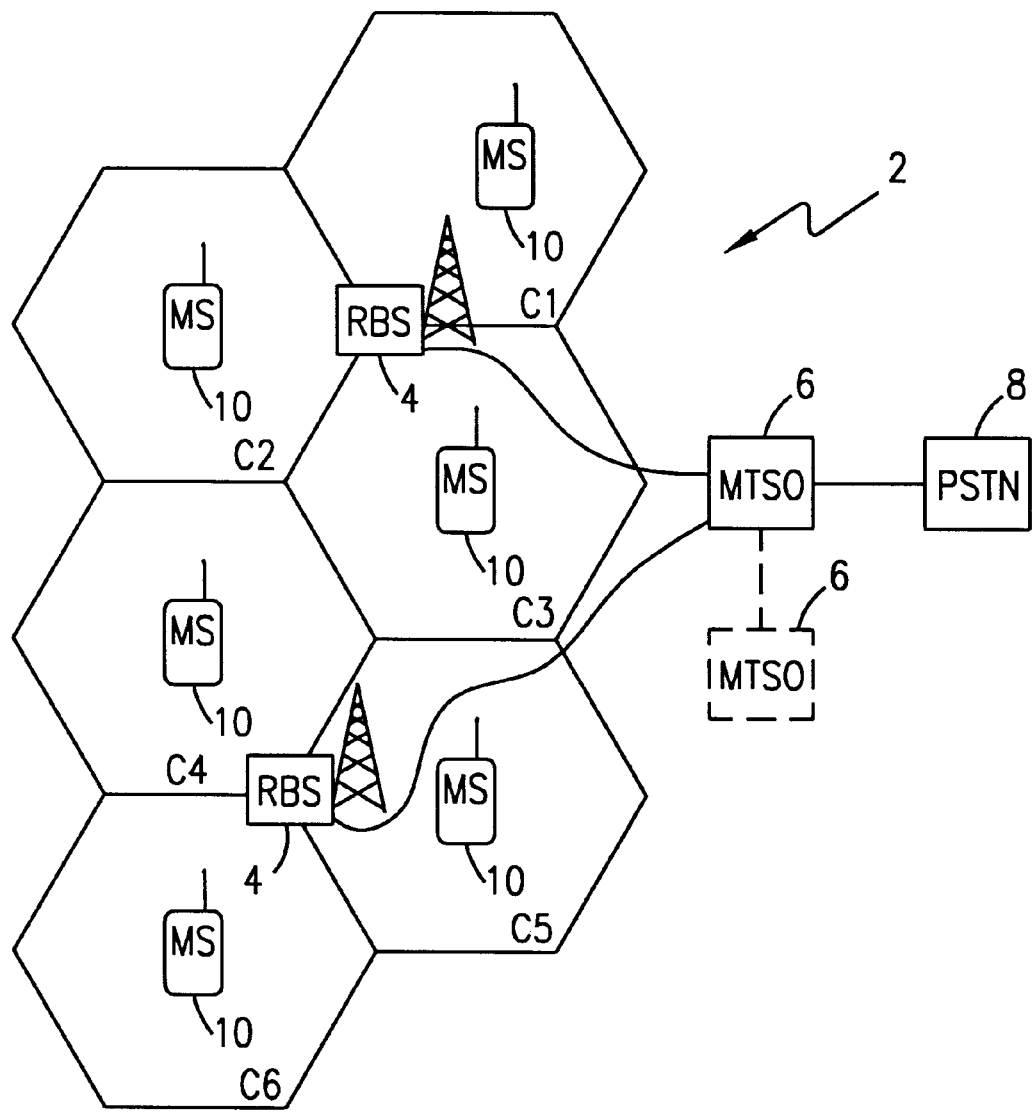
FIG. 1 illustrates a wireless communications system in which the present invention may be incorporated.

The receiver 20 further includes a demodulator 38; deinterleaver 40 and decoder 42. The demodulator 38 retrieves the transmitted signal from the carrier signal, as is well known in the art. The deinterleaver 40 (also known as a demultiplexer) separates any multiplexed signals transmitted by different sources or having different characteristics. The decoder 42 converts the output signal from the deinterleaver 40 from analog to digital and/or decodes any source or channel encoding performed on the signal before transmission. The receiver 20 may have other functionality as well, such as decryption, frequency despreading, or multiple access. Some functions such as decryption and decoding may be performed by the controller 12 shown in FIG. 1 rather than the receiver 20.

Figure 4:
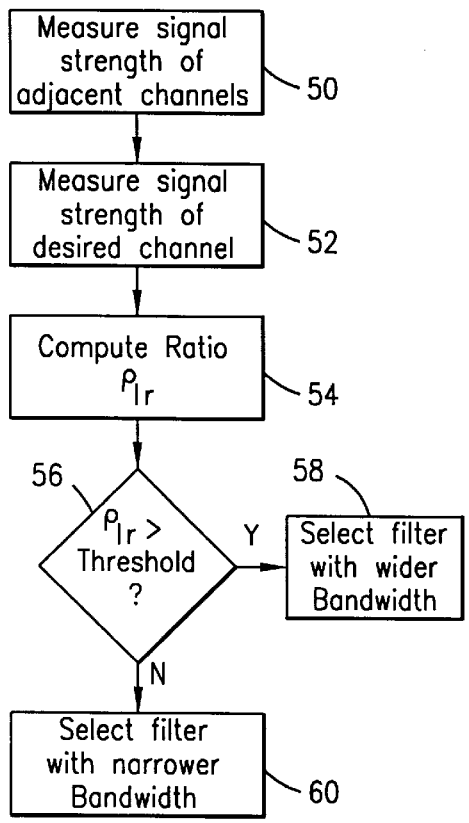
FIG. 4 illustrates a flow chart of the operation of the receiver in the present invention.

The operation of a first embodiment of the mobile station 10 of the present invention is now described with respect to FIG. 4. In step 50, the mobile station 10 measures the signal strength of the two closest adjacent channels to its desired channel for receiving a signal. For example if the mobile station 10 desires to receive a signal on a 15 kHz channel at 1950 to 1965 MHZ, the mobile station 10 measures the signal strength of the right adjacent channel at 1965 to 1980 MHZ and the signal strength of the left adjacent channel at 1935 to 1950 MHZ. In a D-AMPS, or TDMA or TDMA/FDMA cellular system, the mobile station 10 may monitor the adjacent channels during idle time slots. For example, in such systems as described by the EIA/TIA-IS-136 standard or the IS-54-B standard, while on a traffic channel, a mobile station 10 is actively transmitting and receiving less than two-thirds of the time. During idle time periods, the mobile station 10 may scan and measure the signal strength of adjacent channels. In an FDMA system, the mobile station 10 may have to occasionally decide not to monitor an incoming frame in order to monitor and measure the signal strength of an adjacent channel. Alternatively, if the transceiver 16 has more than one receiver 20, the transceiver 16 may simultaneously tune to the desired channel and one of the adjacent channel.

In any of the above situations, the receiver 20 measures the strength of the left and right adjacent channels, denoted herein as $S_l$ and $S_r$ respectively. These signal strength measurements may be refix signal strength indicator (RSSI) measures, for instance, or other measurements that indicate the power of the signal, such as signal energy to noise $E_b/N_o$. The measurements $S_l$ and $S_r$ may be in decibels or amps. The signal strength measurements $S_l$ and $S_r$ may also be averaged over several frames to account for fading. Typically, the controller 12 of the mobile station 10 determines the adjacent channels to measure and signals the synthesizer 13 to generate a frequency corresponding to the adjacent channel to measure. When the synthesizer has stabilized to the frequency of the desired adjacent channel, the controller 12 signals the receiver 20 to measure the signal strength of the signal on that adjacent channel. The receiver 20 performs the measurement and returns the signal strength measurement to the controller 12.

In step 52, the mobile station 10 measures the signal strength of the signal in the desired channel, denoted herein as $S_d$. This signal strength measurement $S_d$ is preferably in the same units as the signal strength measurements $S_l$ and $S_r$ of the adjacent channels.

In step 54, the controller 12 computes the signal strength ratio $\rho_{lr}$ of the signal strength $S_d$ of the desired channel to the signal strength of the adjacent channels $S_l$ and $S_r$. The equation for the signal strength ratio $\rho_{lr}$ is shown below.

$$\rho_{lr} = \frac{S_d}{S_l + S_r}$$

The controller 12 then compares the computed signal strength ratio $\rho_{lr}$ to a predetermined threshold which is stored in a look-up table 15 in the memory 14, in step 56. If the signal strength ratio $\rho_{lr}$ is larger than the predetermined threshold (i.e. no significant adjacent channel interference exists), then the controller 12 signals the receiver 20 to switch to a filter in the down converter stage 32 with a wider bandwidth. A filter with a wider bandwidth allows for a longer range of detection than a narrower bandwidth. Thus, when the signal strength ratio $\rho_{lr}$ is large, the adjacent channel interference is not significant enough to switch to a narrower bandwidth which may result in a reduction of range of detection.

If the signal strength ratio $\rho_{lr}$ is less than the predetermined threshold, significant adjacent channel interference exists. Thus, the controller 12 signals the receiver 20 to switch to a filter in the down converter stage 32 with a narrower bandwidth, in step 60. The narrow bandwidth decreases the effect of adjacent channel interference on the desired signal but also decreases the range of detection.

The predetermined threshold is chosen to optimize the balance between range of detection and adjacent channel interference for a particular application. The determination of the threshold is explained in further detail with respect to FIG. 6. Once determined, the predetermined threshold is stored in the look-up table 15 in the memory 14.

If the receiver 20 is unable to measure the signal strength of adjacent channels, e.g. the receiver is operating in an FDMA system and can not afford to lose a frame, the mobile station 10 may alternatively monitor reliability information for the desired channel. For example, the mobile station 10 may monitor equalizer cumulative metric, decoder cumulative metric or detected error information, such as BER, for the desired channel. The receiver 20 may then switch between IF filters having narrower and wider bandwidths such as filters 33a and 33b in the download converter stage 32 and monitor the reliability information to evaluate the effect that the switch in filters has on the performance of the receiver 20. The mobile station 10 evaluates the results and then switches to the filter with the bandwidth resulting in the highest reliability for the desired channel.

Figure 5:
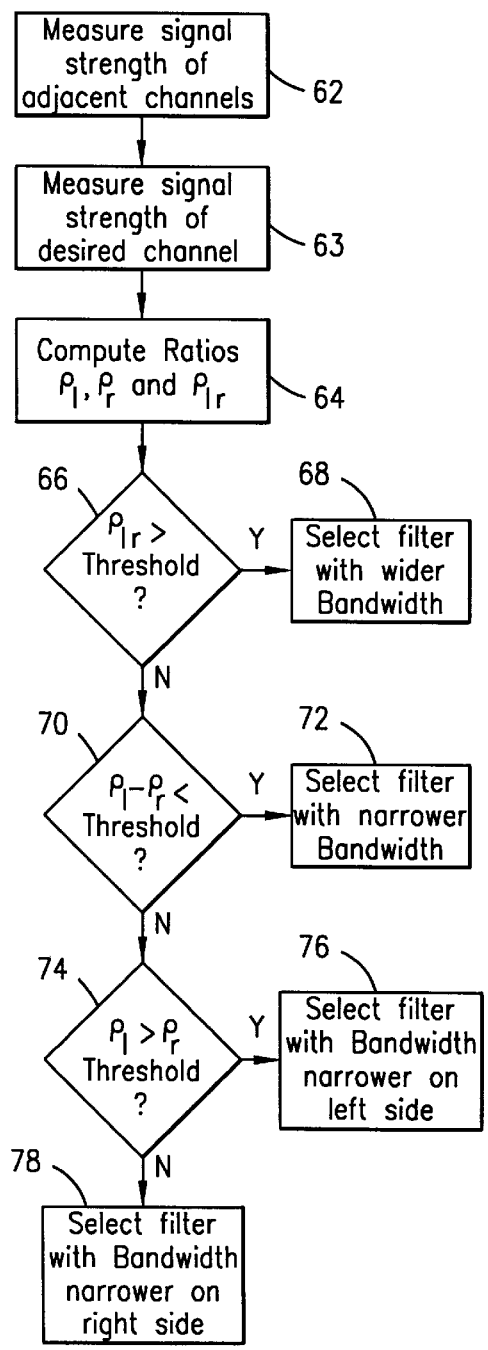
FIG. 5 illustrates a flow chart of a method for determining a predetermined threshold to switch filters in the present invention and the bandwidth of the filters installed in the mobile station.

A second embodiment of the present invention is explained with respect to FIG. 5. In steps 62 and 63, the mobile station 10 measures the signal strength of adjacent channels $S_l$ and $S_r$, the signal strength of the desired channel $S_d$ similarly as in the embodiment in FIG. 4. In step 64, the controller 12 then computes a left signal strength ratio of the left adjacent channel and a right signal strength desired channel, denoted as $\rho_l$, and the ratio of the right adjacent channel and the desired channel, denoted as $\rho_r$, as shown below.

$$\rho_l = \frac{S_d}{S_l} \text{ and } \rho_r = \frac{S_d}{S_r}$$

The controller 12 also computes the signal strength ratio $\rho_{lr}$ of the signal strength of the desired channel to the adjacent channels as previously explained.

The controller 12 in step 66 compares the signal strength ratio $\rho_{lr}$ to a first predetermined threshold stored in the look-up table 15 in the memory 14. If the signal strength ratio $\rho_{lr}$ is greater than the first predetermined threshold, i.e. no significant adjacent channel interference exists, the receiver uses a filter with a wider bandwidth, as shown in step 68. If the ratio $\rho_{lr}$ is less than the first predetermined threshold in step 66, then the controller 12 determines the relationship between $\rho_l$ and $\rho_r$ and selects an IF filter in down converter stage 32 in response to the relationship. In step 70, the mobile station 10 determines if $\rho_l$ and $\rho_r$ are equal or if their difference is less than a second predetermined threshold stored in the look up table 15 in the memory 14. If so, the mobile station 10 selects an IF filter in down converter stage 32 that has a narrower bandwidth. In addition, the IF filter has a roll-off from its 3-dB cut-off on both the left and right side of the peak that are approximately equal. A 3-dB cut-off frequency for a filter is a filter frequency characteristic where for frequencies within the cut-off, the magnitude of the frequency response spectrum for the filter $|H(f)|$ is not less than $1/ /2^1$ times the maximum value of the magnitude of the frequency response spectrum $|H(f)|$.

If the difference between left signal strength ratio $\rho_l$ and right signal strength ratio $\rho_r$ is greater than the second predetermined threshold in step 70, then the controller 12 determines if left signal strength ratio $\rho_l$ is much greater than right signal strength $\rho_r$, i.e. the difference $\rho_l$-$\rho_r$ exceeds the second predetermined threshold. If so, the controller 12 signals the receiver 20 to switch to a filter which is narrower on the right side of the peak, i.e. has a greater roll-off from its 3 dB cut-off. Since left signal strength ratio $\rho_l$ is greater than right signal strength $\rho_r$, the effect of adjacent channel interference is greater from the right adjacent channel. A greater rate of roll-off on the right side from the filter's frequency cut-off will help alleviate channel interference without reducing detection of range more than necessary. The left side from the peak of the filter's frequency response spectrum may remain at the same bandwidth as the filter with the wider bandwidth used in step 68.

If instead right signal strength ratio $\rho_r$ is much greater than left signal strength ratio $\rho_l$, i.e. the difference $\rho_r$-$\rho_l$ exceeds the second predetermined threshold, the receiver 20 switches to a filter which is narrower on the left side of the peak, i.e. has a greater roll-off from its 3 dB cut-off. A greater rate of roll-off on the left side from the filter's frequency cut-off will help alleviate adjacent channel interference without reducing detection of range more than necessary. The right side from the peak of the filter's frequency response spectrum may remain at the same bandwidth as the filter used in step 68 with the wider bandwidth.

The first and second predetermined thresholds are again chosen to optimize the performance of the receiver 20 in view of the trade-off between range of detection and adjacent channel interference. The receiver 20 of the embodiment of FIG. 5 thus includes IF filters exhibiting four different bandwidths: a wider bandwidth, a narrower bandwidth, a narrower bandwidth on the right side and a narrower bandwidth on the left side.

FIG. 6 illustrates a method of selecting the predetermined thresholds and bandwidth of the filters in the embodiments of FIGS. 4 and 5. The IF filters are preferably bandpass filters and may be of various designs known in the art, such as Butterworth filters or Chebyshev filters. The determination of the thresholds and bandwidth of the filters is application specific and thus varies depending on such factors as data rate, channel size, bit error rate desired, and other factors in the application. Once such factors are given for an application, IF filters with various applicable bandwidths should be selected for the determination, as shown in step 80. For example, an application may have IF filters that are Butterworth filters, in a 12.5 kHz channel, with a data rate of 18 kbps, a symbol rate of 9 ksps, in a π/4-DQPSK system. The bandwidths may be ω=1.0,1.05,1.10,1.15,1.20,1.25 for the determination where the factor ω is equal to the ratio of the 3 dB cut-off frequency of a Butterworth filter to the symbol rate. The resulting 3 dB bandwidths then for the IF filters in this example application are equal to 7.57, 7.97, 8.35, 8.72, 9.11 and 9.49 kHz respectively.

In step 82, the value of the carrier to adjacent channel interferer ratio (C/A) is measured for each filter at various bit error rates(BER). The value of the signal energy to noise ratio is fixed at $E_b/N_o$=$\epsilon_B$+3 dB, where $\epsilon_B$ is the signal energy to noise ratio required to achieve a 5% bit error rate. The range of measurements of BER depends on the performance requirement of the system.

In step 86, the value of the carrier to adjacent channel interferer ratio C/A is plotted versus BER for each of the filters. An example of such a plot is shown in FIG. 7 for the above described application. In this example, for simplicity, it was assumed that only interference from a left channel was present. By viewing the plot, an optimal filter for various ranges of carrier to adjacent channel interference ratio C/A that minimizes bit error rate BER may be ascertained. One can see that at low values of the carrier to adjacent channel interference ratio C/A, i.e. less than −40 dB, the filters with narrower bandwidths yield the lowest bit error rates. At high values of carrier to adjacent channel interference ratio C/A, the filters with wider bandwidths yield the lowest bit error rates. By viewing the plot, the best tradeoff of bit error rate to adjacent channel protection may be determined. For example, the optimal filters for this application would be the filter with the widest bandwidth (w=1.25) for values of C/A greater than −20 dB while the filter with the narrowest bandwidth (w=1.0) would be optimal for values of C/A less than −40 dB. One or more predetermined thresholds may be selected depending on the embodiment of the invention implemented. Once selected, the predetermined thresholds and corresponding filter bandwidths are stored in the look-up table 15 in memory 14. In operation, when the measured signal strength ratio $\rho_{lr}$ equals or passes the stored threshold values of the carrier to adjacent channel interference ratio C/A, the receiver switches to the optimal filters indicated in the look-up table 15.

FIGS. 8a through 8c illustrate sample embodiments of the down converter stage 32 to implement the present invention. The bandwidth of the IF filters may be modified to implement the present invention in the analog domain or the digital domain.

In FIG. 8a, the analog filter block 34 of the receiver 20 includes a standard analog filter 94 at a wider bandwidth and one or more alternate analog filters 96, 98, 100 with narrower bandwidths. The analog filters are typically ceramic bandpass filters and may each themselves comprise a cascade of filters to obtain the desired bandwidth.

For the embodiment of FIG. 5, the alternate analog filters may include a filter with a narrower bandwidth 96, a filter with a narrower bandwidth on the right side 98 and a filter with a narrower bandwidth on the left side 100. For the embodiment of FIG. 4, there may only be one alternate analog filter with a narrower bandwidth 96. The receiver 20 also includes a switch 92 operable to switch between the analog filters 94, 96, 98 and 100 in response to a signal indicating which filter to select.

In FIG. 8b, the analog filter block 34 includes a standard analog filter 102 at a wider bandwidth. The receiver 20 also includes a switch 104 operable to switch one or more alternate analog filters 106, 108 and 110 in series with the standard analog filter 102 to obtain a narrower overall filter. For example, when switched in series with the standard filter 102, the alternate analog filter 106 may create a filter having a narrower bandwidth, while alternate analog filter 108 creates a filter with a narrower bandwidth on the right side and the alternate analog filter 110 creates a narrower bandwidth on the left side.

In FIG. 8c, the analog filter block 34 only includes a standard analog filter 112 with a wider bandwidth. The digital filter block 36 includes a standard digital filter 114 and additional digital filters 116, 118, and 120. For example, the additional digital filters may include a filter with a narrower bandwidth 116, a filter with a narrower bandwidth on the right side 118 and a filter with a narrower bandwidth on the left side 120. A switch 122 is operable to selectably switch between the digital filters 114, 116, 118 and 122.

A person of skill in the art would recognize that the implementations of the digital filter block 36 and analog filter block 34 in FIG. 8a, 8b and 8c of the down converter stage 32 may be combined or altered to achieve IF filters with varying bandwidths.

Though the present invention is shown implemented in a mobile station 10, any receiver operating in an environment with adjacent channel interference may benefit from the present invention. For example, a satellite system, where adjacent channels may be used in the same beam, and where link margin is very tight, may benefit from the present invention.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. A receiver, comprising:
    a controller that determines a first ratio of a signal strength of a desired channel and a signal strength of at least one adjacent channel and determines a second ratio of signal strength of a desired channel to signal strength of a left adjacent channel and a third ratio of signal strength of a desired channel to a right adjacent channel; and
    a down converter stage that comprises:
        a first filter with a first bandwidth;
        a second filter with a second bandwidth;
        a third filter that has an arrower band width from the left side than the first bandwidth;
        a fourth filter that has a narrower bandwidth from the right side than the first bandwidth; and
        a switch that switches between the first filter and the second filter in response to the first ratio indicating a predetermined level of adjacent channel interference.

2. The receiver of claim 1, wherein the first ratio is a ratio of a signal strength of the desired channel and a signal strength of at least two adjacent channels; and
    wherein the first filter has a first bandwidth that is narrower than the second bandwidth of the second filter.

3. The receiver of claim 1, wherein the switch switches to the third filter that has a narrower bandwidth from the left side in response to a comparison of the first ratio and the predetermined threshold indicating adjacent channel interference is present and the second ratio of signal strength of a desired channel to signal strength of a left adjacent channel is less than the third ratio of signal strength of a desired channel to a right adjacent channel.

4. The receiver of claim 3, wherein the switch switches to the fourth filter that has a narrower bandwidth from the right side in response to a comparison of the first ratio and the predetermined threshold indicating adjacent channel interference is present and the second ratio of signal strength of a desired channel to signal strength of a left adjacent channel is greater than the third ratio of signal strength of a desire channel to a right adjacent channel.

5. The receiver of claim 4 wherein the switch switches to the second filter that has a narrower bandwidth than the first bandwidth in response to a comparison of the first ratio and the predetermined threshold indicating adjacent channel interference is present and the second ratio of signal strength of a desired channel to signal strength of a left adjacent channel is approximately equal to the third ratio of signal strength of a desired channel to a right adjacent channel.

6. The receiver of claim 5 wherein the down converter stage comprises:
   an analog filter block that includes the first filter, the second filter, the third filter and the fourth filter in parallel; and
   wherein the switch switches between the first, second, third and fourth filters.

7. The receiver of claim 5, wherein the down converter stage comprises an analog filter block that includes:
   a standard filter that is the first filter with a first bandwidth; and
   a first alternate filter selectably switchable to operate in series with the standard filter such that when the first standard filter and the alternate filter operate in series, the standard and first alternate filters comprise the second filter with a second narrower bandwidth.

8. The receiver of claim 7, wherein the analog filter block further includes:
   a second alternate filter selectably switchable to operate in series with the standard filter such that when the standard filter and the second alternate filter operate in series, the standard and alternate filters comprise the third filter with a narrower bandwidth from the left side; and
   a third alternate filter selectably switchable to operate in series with the standard filter such that when the standard filter and the third alternate filter operate in series, the standard and third alternate filters comprise the fourth filter with a narrower bandwidth from the right side.

9. The receiver of claim 8 wherein the analog filter block further includes a switch operable to selectably switch the first, second and third alternate filters in series with the standard filter.

10. The receiver of claim 5, wherein the down converter stage includes:
    a digital filter block that includes the first filter, the second filter, the third filter and the fourth filter in parallel; and
    wherein the switch means switches between the first, second, third and fourth filters.

11. A method of combating adjacent channel interference in a receiver, comprising the steps of:
    measuring a signal strength of a signal on a desired channel;
    measuring a signal strength of a signal on at least one channel adjacent to the desired channel;
    determining a ratio of the signal strength of the desired channel signal to the at least one adjacent channel signal;
    comparing the ratio of the signal strength of the desired channel signal to the adjacent channel signal to determine a level of adjacent channel interference present in the desired channel; and
    selecting a first filter with a first bandwidth in response to the comparing step indicating that adjacent channel interference is low;
    selecting a second filter with a second bandwidth that is narrower than the first bandwidth in response to the comparing step indicating that adjacent channel interference has reached a predetermined level and to a ratio of the signal strength of the desired channel signal to the signal strength of the signal on a left adjacent channel being approximately equal to the ratio of the signal strength of a desired channel signal to the signal strength of the signal on a right adjacent channel.

12. The method of claim 11, wherein the step of measuring a signal strength of a signal on at least one channel adjacent to the desired channel comprises the steps of:
    measuring a signal strength of a signal on a left adjacent channel; and
    measuring a signal strength of a signal on a right adjacent channel.

13. The method of claim 12, wherein the step of determining a ratio of the signal strength of the desired channel signal to the adjacent channel signal comprises the step of determining the ratio of the signal strength of the desired channel signal to the sum of the signal strengths of the left and right adjacent channel signals.

14. The method of claim 13, further including the steps of:
    determining a ratio of the signal strength of the desired channel signal to the signal strength of the signal on the left adjacent channel; and
    determining a ratio of the signal strength of the desired channel signal to the signal strength of the signal on the right adjacent channel.

15. The method of claim 11, further including the step of:
    selecting a third filter with a bandwidth that is narrower than the first bandwidth on the left side in response to the ratio of the signal strength of a desired channel signal to the signal strength of the signal on the left adjacent channel being less than the ratio of the signal strength of a desired channel signal to the signal strength of the signal on the right adjacent channel.

16. The method of claim 15, further including the step of:
    selecting a fourth filter with a bandwidth that is narrower than the first bandwidth on a right side in response to the ratio of the signal strength of a desired channel signal to the signal strength of the signal on a left adjacent channel being greater than the ratio of the signal strength of a desired channel signal to the signal strength of the signal on a right adjacent channel.

17. The method of claim 11, further including the steps of:
    measuring a signal strength to adjacent channel interference ratio for a plurality of filters with different bandwidths;
    measuring a system reliability indicator for the plurality of filters with different bandwidths at various values of signal strength to adjacent channel interference ratio;
    comparing the adjacent channel interference ratio with the bit error rate for each of the plurality of filters; and
    selecting the first bandwidth for the first filter and second bandwidth for the second filter based on the step of comparing.

18. A method of combating adjacent channel interference in a receiver, comprising the steps of:
    measuring a system reliability indicator for a plurality of filters with different bandwidths at various values of signal strength to adjacent channel interference ratio;
    comparing the adjacent channel interference ratio with a bit error rate for each of the plurality of filters;
    selecting the first bandwidth for a filter and second bandwidth for a second filter based on the step of comparing the adjacent channel interference ratio;
    measuring a signal strength of a signal on a desired channel;

measuring a signal strength of a signal on at least one channel adjacent to the desired channel;

determining a ratio of the signal strength of the desired channel signal to the at least one adjacent channel signal;

comparing the ratio of the signal strength of the desired channel signal to the adjacent channel signal to determine a level of adjacent channel interference present in the desired channel;

selecting the first filter with a first bandwidth in response to the comparing step indicating that adjacent channel interference is low; and selecting the second filter with a second bandwidth that is narrower than the first bandwidth in response to the comparing step indicating that adjacent channel interference has reached a predetermined level.

* * * * *

UNITED STATES PATENT AND TRADEMARK OFFICE
CERTIFICATE OF CORRECTION

PATENT NO. : 6,047,171  
DATED : April 4, 2000  
INVENTOR(S) : Khayrallah et al.

Page 1 of 1

It is certified that error appears in the above-identified patent and that said Letters Patent is hereby corrected as shown below:

Column 6, line 5      Replace "$1//2^1$" with -- $1/2^1$ --

Column 8, line 36      Replace "an arrower" with --a narrower--

Signed and Sealed this

Fifth Day of June, 2001

*Attest:*

NICHOLAS P. GODICI

*Attesting Officer*

*Acting Director of the United States Patent and Trademark Office*